US012152995B2

(12) United States Patent
Scott et al.

(10) Patent No.: US 12,152,995 B2
(45) Date of Patent: Nov. 26, 2024

(54) DIE INSPECTION METHOD AND APPARATUS

(71) Applicant: Ontario Die International Inc., Kitchener (CA)

(72) Inventors: Wesley Elton Scott, Kitchener (CA); Darryl Neil Poworoznyk, Kitchener (CA); Mandeep Singh Bhatia, In (CA); Petr Piro, Kitchener (CA); Paul Sajecki, Kitchener (CA); Eliel Paul Amora, Kitchener (CA); Trevor Sean Barnwell, Kitchener (CA); Sebastian Mocny, Kitchener (CA)

(73) Assignee: ONTARIO DIE INTERNATIONAL INC. (CA)

( * ) Notice: Subject to any disclaimer, the term of this patent is extended or adjusted under 35 U.S.C. 154(b) by 254 days.

(21) Appl. No.: 17/737,358

(22) Filed: May 5, 2022

(65) Prior Publication Data
US 2022/0357281 A1 Nov. 10, 2022

Related U.S. Application Data

(60) Provisional application No. 63/184,458, filed on May 5, 2021.

(51) Int. Cl.
*G01N 21/88* (2006.01)
*G01N 21/95* (2006.01)

(52) U.S. Cl.
CPC ..... *G01N 21/8806* (2013.01); *G01N 21/8851* (2013.01); *G01N 21/95* (2013.01)

(58) Field of Classification Search
CPC ........... G01N 21/8806; G01N 21/8851; G01N 21/95; G01N 21/93
See application file for complete search history.

(56) References Cited

U.S. PATENT DOCUMENTS

| | | | | |
|---|---|---|---|---|
| 9,464,992 | B2 * | 10/2016 | O'Dell | H01L 21/67242 |
| 10,937,697 | B2 * | 3/2021 | Sugiya | H01L 21/67288 |
| 2003/0117616 | A1 * | 6/2003 | Nakamura | G01N 21/956 |
| | | | | 356/237.5 |

* cited by examiner

*Primary Examiner* — Hung V Nguyen
(74) *Attorney, Agent, or Firm* — Valauskas Corder LLC

(57) ABSTRACT

A die inspection station for generating an inspection report. The station includes a work surface to receive an entire cutting die thereon for inspection; a housing supporting the work surface; an image capture system supported by the housing above the work surface with an optical axis of the image capture system generally perpendicular to the work surface, the image capture system arranged to capture at least one image of the entire cutting edge of the cutting die; and an illumination source supported by the housing and arranged to illuminate the entire cutting edge at an oblique angle while the image capture system captures the at least one image.

19 Claims, 6 Drawing Sheets

DIE INSPECTION METHOD AND APPARATUS

CROSS-REFERENCE TO RELATED APPLICATIONS

This application claims the benefit of U.S. Provisional Patent Application No. 63/184,458 filed May 5, 2021, incorporated by reference in its entirety.

FIELD

The specification relates generally to apparatuses and methods associated with inspecting cutting dies, and more specifically to automated inspection and certification.

BACKGROUND

International Pat. App. Pub. No. WO 1996/021529 to Booth et al. ("Booth") purports to disclose a profile definition system for use with profile bending apparatus using an imaging process. Booth purports to disclose that a profile such as that used to form a cutting knife is located above a non-reflective surface such that the profile configuration can be imaged through a camera substantially mounted above it. Booth purports to disclose the profile being illuminated from above. Booth purports to disclose the camera image being captured by a frame grabber device such that the profile configuration can be compared in comparator means with a desired profile shape. Booth also purports to disclose that dependent upon the comparison further profile strip feed and/or bend operations may be performed in order to bring into substantial agreement the actual strip profile and the desired strip profile.

U.S. Pat. No. 5,461,893 to Tyler ("Tyler") purports to disclose an apparatus and method for the automated bending of continuous reels of metal strips, particularly for the bending of sharpened metal strip into steel rule dies. Tyler purports to disclose a sequence of steps to perform a number of bends in the strip, at various positions on the strip, and of various magnitudes, in order to approximate the shape desired. Tyler purports to disclose that data containing the shape to be produced is introduced into a programmable computation and control system, which also contains data regarding the physical characteristics of the metal strip. Tyler also purports to disclose that an optical detection system is used to detect the shape produced at every step, and an electrical signal is fed back from the detection system into the computation and control system to compensate for any errors, particularly those errors caused by springback of the metal strip.

International Pat. App. Pub. No. WO 2004/071687 to Park ("Park") purports to disclose a method for automatically correcting a bending angle of a cutting blade, including the steps of (1) bending the cutting blade, based on basic bending data stored in a memory equipped in computer control means adapted to control a cutting blade bending machine, (2) picking up a profile of the cutting blade bent based on the basic bending data, and transmitting the picked-up profile to the computer control means, and (3) reading out the transmitted profile of the cutting blade, thereby deriving an actual bending angle. Park purports to disclose that, in accordance with this method, data required in linear bending processes or bending processes for forming an arc-shaped bent portion can be derived. Park also purports to disclose that, accordingly, it is possible to accurately bend cutting blades.

SUMMARY

The following summary is intended to introduce the reader to various aspects of the applicant's teaching, but not to define any invention.

According to some aspects, there is provided a die inspection system, comprising a work surface to receive an entire cutting die thereon for inspection, the cutting die having a cutting edge; a housing supporting the work surface; an image capture system supported by the housing and arranged to capture at least one image of the entire cutting edge of the cutting die on the work surface; an illumination source supported by the housing and arranged to illuminate the cutting die at an oblique angle while the image capture system captures the at least one image; at least one data storage device storing a set of cutting edge specifications; at least one processor communicative coupled to the image capture system, communicatively coupled to the at least one data storage device, and operable to: receive the at least one image, retrieve the set of cutting edge specifications, identify the entire cutting edge as shown in the at least one image, comparing the cutting edge as shown in the at least one image to the set of cutting edge specifications, and generate an inspection report indicative of whether the entire cutting edge as shown in the at least one image is within a tolerance of the set of cutting edge specifications.

In some examples, the inspection report includes a modified image modified from the at least one image to indicate whether the cutting edge as shown in the at least one image is within the tolerance of the set of cutting edge specifications.

In some examples, the die inspection system includes a calibration plate with a plurality of reference points regularly spaced and distributed over a top surface of the calibration plate, the calibration plate sized to fit on the work surface, and the image capture system is operable to move between at least a first position and a second position, and is operable to be calibrated using the calibration plate after being moved to allow for a distortion to be corrected.

In some examples, the illumination source includes at least one light emitting diode.

In some examples, the illumination source includes a first source at a first distance above the work surface and a second source at a second distance above the work surface, the second distance being at least one and a half times the first distance.

In some examples, the at least one processor includes a machine vision algorithm to detect the cutting edge when the cutting edge has been chalked.

In some examples, the cutting die is at least 10 cm wide.

According to some aspects, there is provided a die inspection system, comprising a work surface to receive an entire cutting die thereon for inspection, the cutting die resting with a lower end of the cutting die on the work surface and a cutting edge on an upper end of the cutting die opposite the lower end; a housing supporting the work surface; an image capture system supported by the housing above the work surface with an optical axis of the image capture system generally perpendicular to the work surface, the image capture system arranged to capture at least one image of the entire cutting edge of the cutting die; and an illumination source supported by the housing and arranged to illuminate the entire cutting edge at an oblique angle while the image capture system captures the at least one image.

In some examples, the work surface is a generally planar and stationary surface and is rigidly secured to the housing such that the cutting die is stationary when on the work surface.

In some examples, the die inspection system further comprises a calibration plate for use in calibrating the image capture system, the calibration plate including a plurality of reference points regularly spaced and distributed over a top surface of the calibration plate, the calibration plate sized to fit over the work surface.

In some examples, the die inspection system can be reconfigured between a first image capture configuration and a second image capture configuration, a distance between the image capture system and the calibration plate of the die inspection system being greater in the second configuration than in the first configuration.

In some examples, the die inspection system further comprises an electronic screen supported by the housing; at least one data storage device storing a set of cutting edge specifications; at least one processor communicative coupled to the image capture system, communicatively coupled to the at least one data storage device, and communicatively coupled to the electronic screen, the at least one processor operable to: receive the at least one image, retrieve the set of cutting edge specifications, identify the entire cutting edge as shown in the at least one image, comparing the cutting edge as shown in the at least one image to the set of cutting edge specifications, generate a modified image modified from the at least one image to indicate whether the identified cutting edge in the at least one image is within the tolerance of the set of cutting edge specifications, and display the modified image via the electronic screen.

According to some aspects, there is provided a method of inspecting a cutting die, comprising capturing at least one image of an entire cutting edge of an entire cutting die that is on a work surface; retrieving, using at least one electronic processor, a set of cutting edge specifications from at least one electronic data storage device; identifying the entire cutting edge as shown in the at least one image; comparing, using the at least one electronic processor, the entire cutting edge as shown in the at least one image to the set of cutting edge specifications; determining that the entire cutting edge as shown in the at least one image is within a tolerance of the set of cutting edge specifications; and generating, using the at least one processor, an inspection report for the cutting die, the inspection report indicative that the entire cutting edge as shown in the at least one image is within the tolerance of the set of cutting edge specifications.

In some examples, the inspection report includes the at least one image or a modified image modified from the at least one image to indicate whether the cutting edge as shown in the at least one image is within the tolerance.

In some examples, the method further comprises, prior to capturing the at least one image, a human operator placing the cutting die on the work surface.

In some examples, the method further comprises, prior to capturing the at least one image, chalking the cutting edge.

In some examples, chalking the cutting edge includes an individual manually applying chalk to the cutting edge.

In some examples, the method further comprises, while capturing the at least one image, illuminating the cutting edge at an oblique angle.

In some examples, capturing the at least one image includes using an image capture system supported by a housing to capture the at least one image, the housing supporting the work surface and supporting the image capture system above the work surface.

In some examples, the method further comprises moving, following capturing the at least one image, the image capture system from a first position relative to the work surface to a second position relative to the work surface; calibrating the image capture system to correct for a lens distortion; capturing at least one further image of a further entire cutting edge of a further entire cutting die; retrieving, using the at least one electronic processor, a further set of cutting edge specifications from the at least one electronic data storage device; identifying the further entire cutting edge as shown in the at least one further image; comparing, using the at least one electronic processor, the further entire cutting edge as shown in the at least one further image to the further set of cutting edge specifications; determining that the further entire cutting edge as shown in the at least one further image is within a further tolerance of the further set of cutting edge specifications; and generating, using the at least one processor, a further inspection report for the further cutting die, the inspection report indicative that the further entire cutting edge as shown in the at least one further image is within the further tolerance of the further set of cutting edge specifications.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
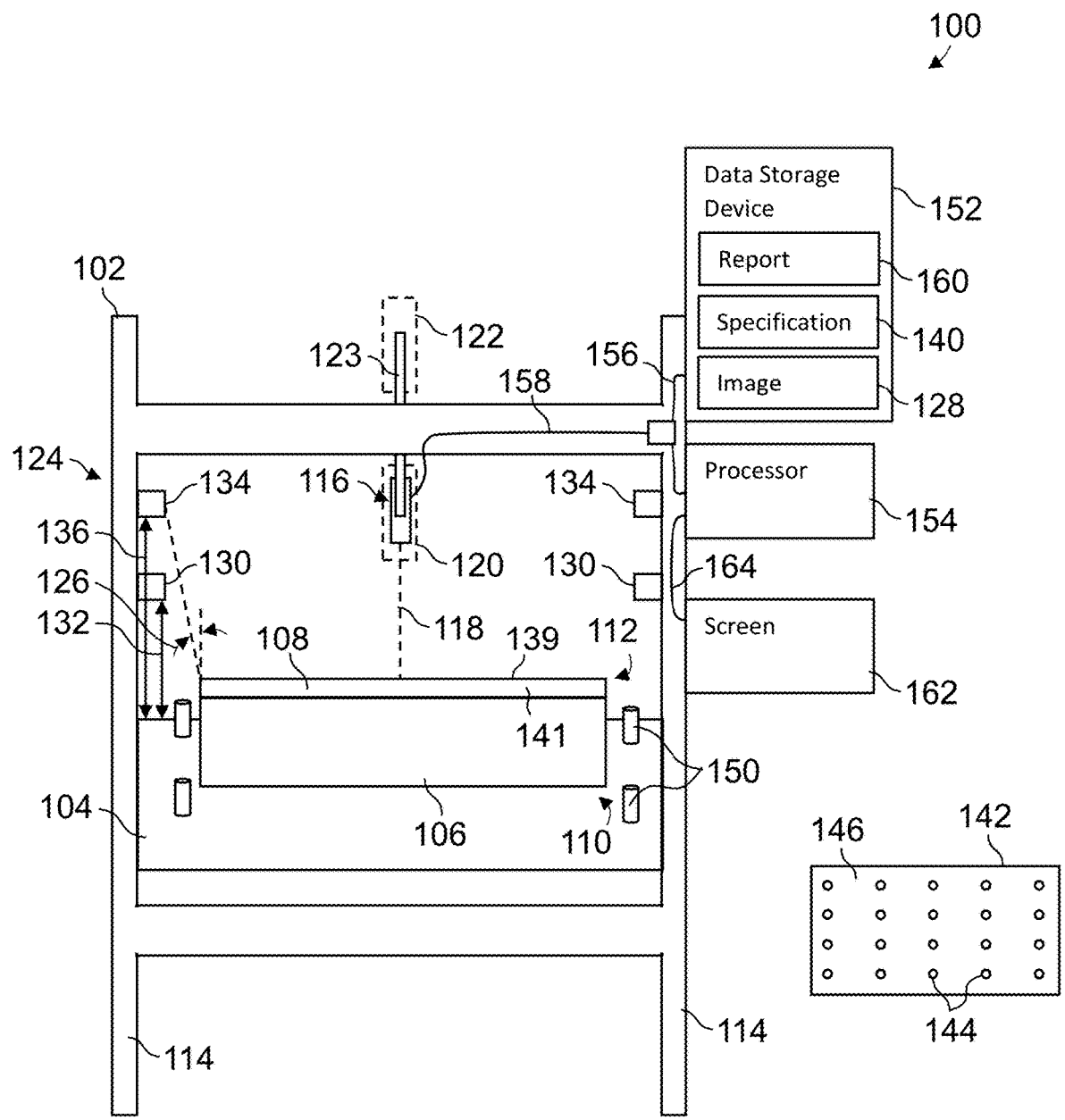
FIG. 1 is schematic diagram of a first example die inspection station.

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses or process described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim, or dedicate to the public any such invention by its disclosure in this document.

As used herein and in the claims, two or more parts are said to be "coupled", "connected", "attached", "joined", "affixed", or "fastened" where the parts are joined or operate together either directly or indirectly (i.e., through one or more intermediate parts), so long as a link occurs. As used herein and in the claims, two or more parts are said to be "directly coupled", "directly connected", "directly attached", "directly joined", "directly affixed", or "directly fastened" where the parts are connected in physical contact with each other. As used herein, two or more parts are said to be "rigidly coupled", "rigidly connected", "rigidly attached", "rigidly joined", "rigidly affixed", or "rigidly fastened" where the parts are coupled so as to move as one while maintaining a constant orientation relative to each other. None of the terms "coupled", "connected", "attached", "joined", "affixed", and "fastened" distinguish the manner in which two or more parts are joined together.

Further, although method steps may be described (in the disclosure and/or in the claims) in a sequential order, such methods may be configured to work in alternate orders. In other words, any sequence or order of steps that may be described does not necessarily indicate a requirement that the steps be performed in that order. The steps of methods described herein may be performed in any order that is practical. Further, some steps may be performed simultaneously.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the examples described herein may be practiced without these specific details. In other instances, well-known methods, procedures, and components have not been described in detail so as not to obscure the examples described herein.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Referring to FIG. 1, illustrated is an example of a die inspection system 100. The die inspection system 100 is provided for use in inspecting cutting dies (i.e., blades such as steel blades made with plain or serrated steel, prior to and/or after being fastened to a die board). Cutting dies may be used for cutting a variety of materials, such as fabric and leather, and may be formed by bending steel strips (e.g., sharpened on one edge) into a desired shape. For many applications, the bending or other manufacturing process must be exact, as the cutting die must be able to cut accurately. In some examples, the die inspection system 100 is used to verify that a cutting die is of a high quality and/or accuracy (i.e., the shape of the cutting die matches the desired shape).

The die inspection system 100 may be used to check the cutting die, and, in some examples, is used to certify that the die meets a quoted accuracy. The die inspection system 100 may be configured to provide an inspection report, as detailed further below, and the inspection report may include a certification (e.g., a certification document in hard and/or electronic form) and/or information required to reproduce the inspection. Information required to reproduce the inspection may include a representative image, a listing of inspection settings, a listing of calibration values, the specifications applied to the cutting edge, information indicative of the software version used, information indicative of the station software configuration, information indicative of the station model number, information indicative of the station serial number, and/or information indicative of the date of the inspection (e.g., the date and time to the minute).

The die inspection system 100 includes a housing 102. The housing 102 is may be a rigid structure provided for support, and may be formed of, e.g., steel, aluminum, or wood.

The die inspection system 100 includes a work surface 104. An entire cutting die 106 may be received on the work surface 104 for inspection. The cutting die 106 may be a relatively large cutting die, e.g., for cutting parts for the automotive industry (e.g., seat fabric or leather). The cutting die 106 may be, e.g., at least 10 cm, at least 20 cm, or at least 30 cm in width. The cutting die may have a perimeter that is greater than 10 mm in length, greater than 100 mm in length, greater than 1000 mm in length (e.g., about 500 mm to about 1,500 mm).

The cutting die 106 includes a cutting edge 108, and the inspection may be an inspection of the cutting edge 108 to verify that the cutting edge 108 meets user requirements. The work surface 104 may receive the cutting die 106 thereon with the cutting die 106 resting with a lower end 110 of the cutting die 106 on the work surface 104 and the cutting edge 108 on an upper end 112 of the cutting die 106 opposite the lower end 110.

The housing 102 supports the work surface 104. In some examples, the work surface 104 is rigidly coupled to the housing 102 such that the cutting die 106 on the work surface 104 is held stationary. Holding the cutting die 106 stationary may facilitate an accurate inspection of the cutting die 106.

In some examples, the die inspection system 100 is a free standing work station, as illustrated in FIG. 1. The housing 102 may include legs 114 such that the housing 102 may be positioned in a work area (e.g., a shop or factory floor). The die inspection system 100 may be a self-contained station or unit that is free of other stations or units. For example, the die inspection system 100 may be provided at a work site where the cutting die 106 is produced and/or used, and an individual may carry the cutting die 106 to the die inspection station 100 and place the cutting die 106 on the work surface 104 for inspection. The work surface 104 may be sized to receive the entire cutting die 106 resting freely on the work surface 104 and spaced from manufacturing or use equipment (e.g., any equipment that might interfere with taking a clear image of the cutting die 106).

In some examples, the die inspection station 100 is operable in hot environments (e.g., the electronics are selected to function normally in hot environments such as hot factories). For example, the die inspection station 100 may be operable in temperatures of up to 50 degrees Celsius, up to 60 degrees Celsius, or up to 70 degrees Celsius.

The die inspection system 100 also includes an image capture system 116 arranged to capture at least one image 128 of the entire cutting die 106 and/or the entire cutting edge 108 on the work surface. The cutting edge 108 may be about as large as the cutting die. For example, the cutting edge 108 may define a perimeter that is at least 10 cm, at least 20 cm, or at least 30 cm in width. The image capture system 116 may be configured to capture the entire cutting edge 108 in a single image. The image capture system 116 may include a camera (e.g., a 45 megapixel camera) or a plurality of cameras (e.g., three 20 megapixel cameras).

The image capture system 116 is also supported by the housing 102. In some examples, as illustrated, the image capture system 116 is supported by the housing 102 above the work surface 104 with an optical axis 118 of the image capture system 116 generally perpendicular to the work surface 104 (e.g., generally perpendicular to a generally horizontal and planar work surface 104). In some examples, the image capture system 116 is rigidly coupled to the housing 102 such that the image capture system 116 can be held steady relative to the cutting die 106, which may, e.g., facilitate an accurate inspection.

In some examples, the image capture system 116 may be moveable between two or more positions, each of which is a position in which the image capture system 116 is rigidly coupled to the housing 102. For example, the image capture system 116 may have a first image capture location 120 and a second image capture location 122 and may move between the first image capture location 120 and the second image capture location 122 via, e.g., a track 123. When in each location the image capture system 116 may be held (e.g., releasably held) rigidly coupled to the housing 102 (e.g., such that the image capture system 116 is rigidly coupled to the work surface 104 through the housing 102).

The die inspection system 100 also includes an illumination source 124. The illumination source 124 is supported by the housing 102. In some examples, the illumination source 124 is also rigidly coupled to the housing 102. The illumination source 124 is arranged to illuminate the cutting die 106 and/or the cutting edge 108 at an oblique angle 126 while the image capture system 116 captures the at least one image 128.

The illumination source 124 may include at least one light emitting diode. In some examples, the illumination source 124 includes a first source 130 at a first distance 132 above the work surface 104 and a second source 136 at a second distance 136 above the work surface 104. The second distance 136 is greater than the first distance 132, and may be, e.g., at least 1.1 times, at least 1.5 times, or at least 2 times the first distance 132.

In some examples, the cutting edge 108 includes the sharp margin 139 and an adjacent width 141. In some examples, the adjacent width is at least ⅕, at least ¼, or at least ⅓ of the tolerance allowed by the set of specifications 140. For example, if the set of specifications 140 includes a tolerance of 0.5 mm, the adjacent width may be 0.16 mm. In some examples, the adjacent width must be at least 2 pixels or at least 3 pixels in the at least one image 128. For example, if the adjacent width is 0.16 mm, then since 0.16/3=0.05 the die inspection system 100 may be configured to capture images of the cutting edge at least 0.05 mm/pixel or 20 pixels per mm at a minimum.

Calibration may be important to achieve a high accuracy (e.g., sub-millimeter). In some examples, the die inspection station 100 includes a calibration plate 142. The calibration plate 142 includes a plurality of reference points 144. The reference points 144 are regularly spaced and distributed over a top surface 146 of the calibration plate 142. The calibration plate 142 is sized to fit on the work surface 104.

In some examples, the die inspection system 100 can be reconfigured between a first image capture configuration and a second image capture configuration, a distance between the image capture system and the calibration plate of the die inspection system being greater in the second configuration than in the first configuration. For example, as indicated above, the image capture system 116 may be operable to move between at least the first position 120 and the second position 122. The image capture system 116 is operable to be calibrated using the calibration plate 142 after being moved. Calibration may allow for a distortion to be corrected. Alternatively or additionally, the system 100 may accommodate dies of varying heights in other ways (e.g., rather than having the table and/or image capture system moveable). For example, the calibration plate 142 may be raised using one or more spacers under the calibration plate 142 that raise the calibration plate 142 a predetermined height (e.g., the same height as the die that is to be inspected), at which point the system 100 may be calibrated and the calibration saved. A calibration may be saved for each die height of a set of die heights.

In some examples, the calibration plate 142 includes at least 2 by 3 or 3 by 2 reference points 144. The reference points 144 may be holes in the calibration plate 142. The sizing of the calibration plate 142 may be considered in terms of the pixels size of the reference plate when imaged by the image capture system 116. The radius of the reference points 144 may be between 2 pixels and 20 pixels, between 4 pixels and 12 pixels or between 6 pixels and 10 pixels. The center-to-centre distance between reference points 144 may be between 5 pixels and 50 pixels, between 10 pixels and 40 pixels, between 18 pixels and 32 pixels, or about 22 pixels. In some examples, the outside edge of each reference point 144 is at least 3 pixels, at least 5 pixels, or at least 6 pixels from the outside edge of any other reference point 144.

In some examples, a plurality of reference shapes 150 are mounted to the work surface 104. The size and/or position of the reference shapes 150 is known, and the calibration of the system 100 may be verified by comparing the shapes as seen in the image 128 to the known size and/or position of the reference shapes.

The die inspection system 100 also includes at least one data storage device 152. The data storage device 152 stores a set of cutting edge specifications 140. The set of cutting edge specifications 140 may be, e.g., a model (e.g., a .DXF file containing a single cavity or a plurality of cavities) of a desired cutting die showing the desired shape of a desired cutting edge on the desired cutting die. In some examples, the set of cutting edge specifications 140 is a digital file or a portion of a digital file (e.g., a digital representation of a cavity of a file representing a plurality of cavities).

The die inspection system 100 also includes at least one processor 154. The processor 154 is communicatively coupled to the data storage device 152, e.g., such that the processor 154 may retrieve the set of cutting edge specifications 140 that are stored on the data storage device 152. The processor 154 may be communicatively coupled to the data storage device 152 by a first communications link 156, which may be wired (as illustrated in FIG. 1) and/or wireless (e.g., through the Internet or an intranet).

In some examples, the image capture system 116 and the data storage device 152 are also communicatively coupled, and the at least one image 128 of the cutting die can be stored on the data storage device 152. The processor 154 is also communicatively coupled to the image capture system 116. The processor may be communicatively coupled to the image capture system 116 by a second communications link 158, which may also be wired (as illustrated) and/or wireless. In some examples, the processor 154 is also, or alternatively, communicatively coupled to the image capture system 116 via the data storage device 152.

As in the illustrated example, the processor 154 and the data storage device 152 may be coupled to the housing 102. However, in other examples, the processor 154 and/or the data storage device 152 may be adjacent the housing 102 and/or remote from the housing 102. The data storage device 152 and the processor 154 may be adjacent one another or remote from one another, and may be distributed.

The processor 154 is operable to conduct an inspection of the cutting die 106 via the at least one image 128, as described further below. The processor 154 is operable to generate an inspection report 160 and/or present inspection results to an operator. For example, the die inspection system 100 may include an electronic screen 162 (e.g., a touchscreen), and the processor 154 may be operable to present information via the screen 162. The processor may be communicatively coupled to the screen 162 by a third communications link 164, which may also be wired (as illustrated) and/or wireless.

Figure 2:
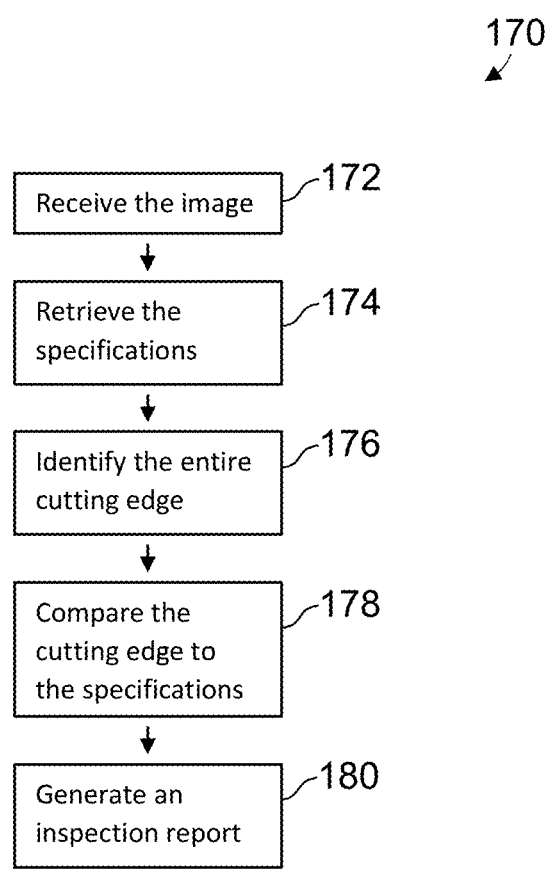
FIG. 2 is a flow diagram of a method of generating an inspection report.

Referring to FIG. 2, the processor 154 is operable to perform a method 170 of generating an inspection report 160. The processor 154 is operable to compare the at least one image 128 to the set of cutting edge specifications 140 to generate the inspection report.

The processor 154 is configured to, at step 172, receive the at least one image 128. The processor 154 may retrieve the at least one image from the data storage device 152, however in some examples the processor 154 receives the at least one image 128 directly from the image capture system 116 (e.g., not via the data storage device 152 and/or within 10 seconds, within 5 seconds, or within 1 second of the image capture system 116 capturing the at least one image 128).

In some examples, the at least one image 128 is a plurality of images. For example, the at least one image 128 may be a set of at least 4 images, at least 6 images, or at least 9 images.

The processor 154 is also configured to, at step 174 retrieve the set of cutting edge specifications 140, e.g., from the data storage device 152. The set of cutting edge specifications 140 may be, for example, a model or a portion of a model. For example, the model may include specifications for multiple cutting dies, and the processor 154 may retrieve all these specifications or only the specifications for the cutting die 106 shown in the at least one image 128.

The processor 154 is configured to compare the at least one image 128 to the set of specifications 140. At step 176, the processor 154 identifies the entire cutting edge 108 as shown in the at least one image 128. For example, the processor 154 may include machine vision software which may identify the cutting edge 108 in the at least one image 128. In some examples, the machine vision algorithm is configured to detect the cutting edge 108 when the cutting edge 108 has been chalked (i.e., marked with, e.g., chalk or soapstone). Where the at least one image 128 is a plurality of images, the processor 154 may find the edge lines for each cutting edge of each of the plurality of images and filter out outlier data (e.g., outlier data due to minor inflections in lighting that affect the ability to find consistent edges).

At step 178, the processor compares the cutting edge 108 as shown in the at least one image 128 to the set of cutting edge specifications 140. For example, the processor 154 may determine that the cutting edge 108 matches the set of cutting edge specifications 140, e.g., matches a desired cutting edge within an allowable tolerance (e.g., less than 1 mm deviation). In some examples, the allowable tolerance may be zero (e.g., if the difference must be equal to or less than the difference detectable by the die inspection system 100).

The cutting edge may have various shapes, and may include sharp bends. For example, a desired cutting edge (e.g., a model of a cutting die that is to be manufactured) may include a sharp bend or an angle (e.g., two portions joined at a 30 degree angle, a 45 degree angle or a 90 degree angle), such as a notch or other feature. The cutting die 106 may be acceptable even if it does not have the sharp bend or the angle, particularly right at the apex of the angle or the tightest part of the bend. In some examples, the processor 154 is configured to apply a relaxed tolerance to a sharp bend or an angle. For example, the specification 140 may include a relaxed tolerance for angles or bends (e.g., sharp angels may have a radius applied to the intersection).

At step 180, the processor generates an inspection report 160. The inspection report 160 is indicative of whether the entire cutting edge 108 as shown in the at least one image 128 is within a tolerance of the set of cutting edge specifications 140 (e.g., within the allowable tolerance of the desired cutting edge).

The inspection report 160 may be stored on the data storage device 152, as in FIG. 1. However, in some examples, the inspection report 160 or a portion thereof is also or alternatively displayed on screen 162 and/or sent to another data storage device or third party.

Figure 3:
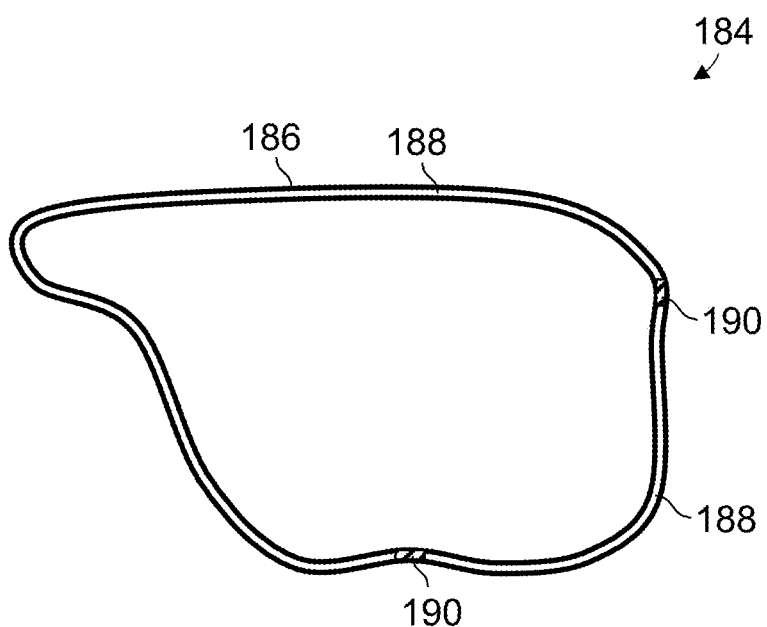
FIG. 3 is a schematic diagram of a cutting edge.

Referring to FIG. 3, the inspection report 160 may include a modified image 184 modified from the at least one image 128 to indicate whether the cutting edge 108 as shown in the at least one image 128 is within the tolerance of the set of cutting edge specifications 140.

As in the illustrated example of FIG. 3, the modified image 184 may include a coded line 186 tracing of the identified cutting edge 108. The coded line 186 may have approved portions 188 that indicate that the corresponding portions of the cutting edge 108 are acceptable (e.g., good or at least within tolerance) and/or unapproved portions 190 that indicate that the corresponding portions of the cutting edge 108 are unacceptable (e.g., out of tolerance or close to tolerance). In some examples, the report 160. In some examples, the approved portions 188 and/or unapproved portions 190 are color-coded. For example, the approved portions 188 may be green and the unapproved portions 190 may be red. In some examples, the modified image may show some areas as neither approved nor unapproved (e.g., barely within tolerance, such as in yellow).

In some examples, the modified image 184 is generated prior to the generation of the report 160 and/or without the generation of the report 160. For example, the modified image 184 may be used by an operator to determine that changes are needed before the cutting die is ready to be the subject of an inspection report 160. For example, the modified image 184 may be displayed on the screen 162 and/or stored or sent to another device to be considered by an operator.

Figure 4:
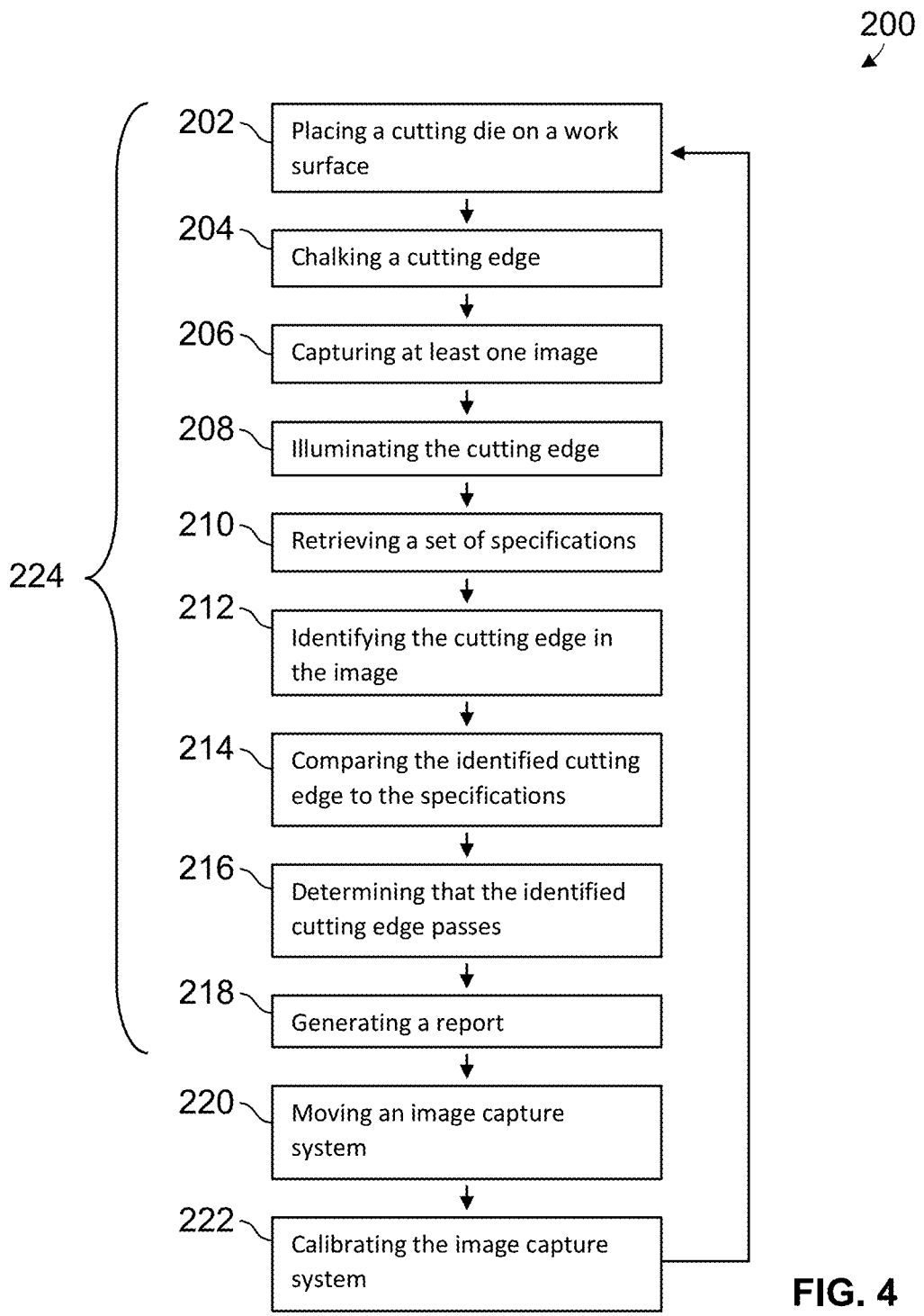
FIG. 4 is a flow diagram of a method of inspecting a cutting die.

Referring now to FIG. 4, illustrated is a method 200 of inspecting a cutting die. Inspections may be useful for, e.g., determining what changes are needed to finish the cutting die and/or generate a report or certificate to be associated with a finished die.

In some examples, the method 200 is carried out via a free-standing die inspection station (e.g., system 100). A free-standing die inspection station may be separate from any bending or other manufacturing equipment (e.g., to allow the method to be carried out without interference from other equipment). The method 200 may involve a human operator preparing and/or positioning the cutting die. For example, the method 200 may include, at step 202, a human operator placing the cutting die (e.g., cutting die 106) on the work surface (e.g., work surface 104).

The method 200 may also include, at step 204, chalking the cutting edge. For example, the step 204 may include an individual manually applying chalk to the cutting edge (e.g., applying engineering chalk to the cutting edge). Calk may assist in differentiating the cutting edge from the rest of the die and/or background to facilitate identifying the cutting edge.

The method 200 includes, at step 206, capturing at least one image of an entire cutting edge of an entire cutting die (e.g., edge 108 of die 106) that is on a work surface (e.g., work surface 104). Capturing the entirety of the cutting edge may allow for a fulsome inspection report. The method 200 may include, at step 208, illuminating the cutting edge at an oblique angle (e.g., angle 126) while capturing the at least one image.

The method 200 also includes, at step 210, retrieving, using at least one electronic processor (e.g., processor 154), a set of cutting edge specifications (e.g., specifications 140) from at least one electronic data storage device (e.g., device 152). The specifications may be from a model and may describe the ideal form of the die and/or an allowable tolerance.

The method 200 includes, at step 212, identifying the entire cutting edge as shown in the at least one image (e.g., via machine vision). The method 170 also includes, at step 214, comparing, using the at least one electronic processor, the entire cutting edge as shown in the at least one image to the set of cutting edge specifications.

If the inspection is passed, the method 200 generates a report indicating this. For example, the method 200 includes, at step 216, determining that the entire cutting edge as shown in the at least one image is within a tolerance of the set of cutting edge specifications. The method 200 also includes, at step 218, generating, using the at least one processor, an inspection report (e.g., report 160) for the cutting die, the inspection report indicative that the entire cutting edge as shown in the at least one image is within the tolerance of the set of cutting edge specifications (i.e., the cutting die passed the inspection). This report may be sent or stored. For example, the report may be stored as an electronic file on a data storage device to be, e.g., provided to a customer who is purchasing the cutting die.

In some examples, more than one cutting die is inspected. The cutting dies may be inspected sequentially. The cutting dies may be of a different shape, and the position of the image capture system may be adjusted between inspections. Adjusting the position of the image capture system may require calibrating the image capture system (e.g., to correct distortion). In some examples, the method 200 includes, at step 220, moving the image capture system between image capture events to accommodate a further cutting die (i.e., a different cutting die from the one imaged earlier in the method 200). The method 200, may then include, at step 222, calibrating the image capture system (e.g., using the calibration plate 142), and then repeating the inspection steps 224 for the further cutting die.

Figure 5:
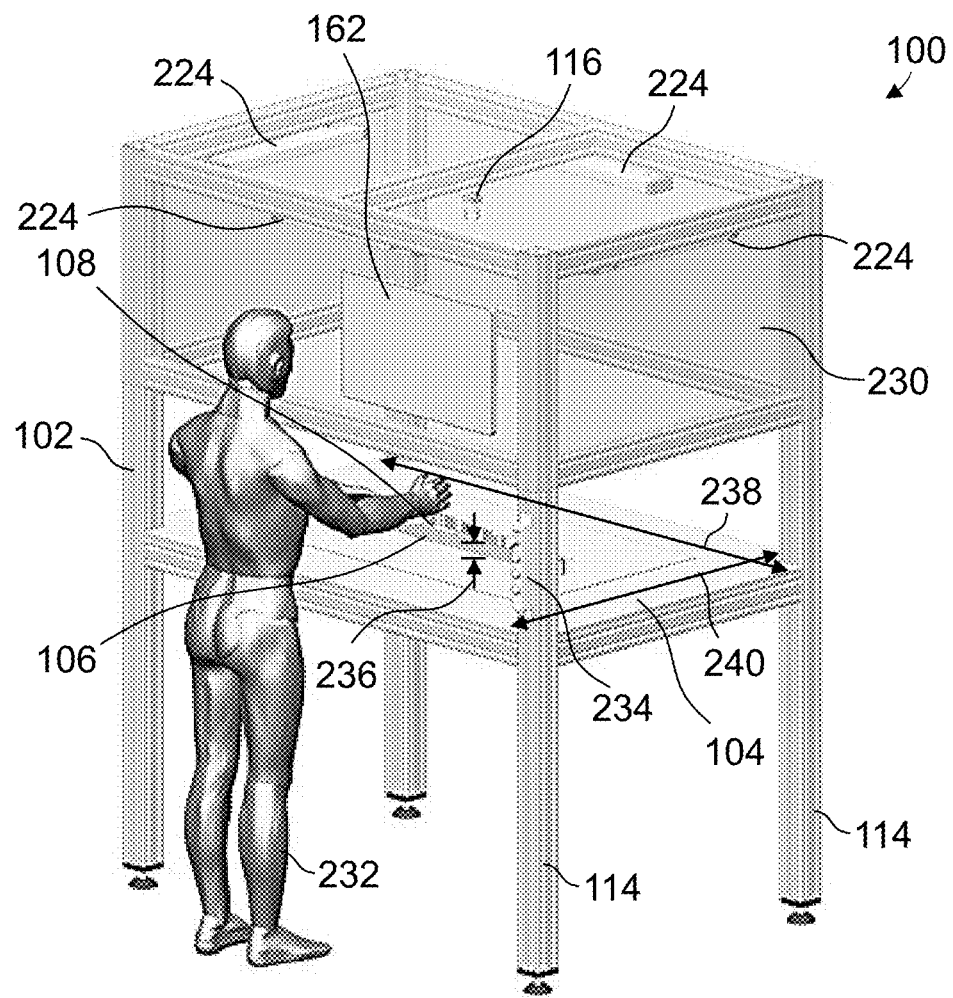
FIG. 5 is a perspective view of a second example die inspection station.

Referring to FIG. 5, illustrated is another example of a die inspection station 100. The housing 102 of the die inspection station 100 includes an enclosure 230. The enclosure 230 may be raised (e.g., to permit an operator 232 to place the cutting die 106 on the work surface 104) and lowered (e.g., to prevent interference during an image capture event). For example, the enclosure 230 may be controlled via a control panel 234 of the housing 102.

In some examples, as illustrated in FIG. 5, the die inspection system 100 is configured for use with cutting dies having heights 236 of between 10 mm and 100 mm, between 15 mm and 60 mm, or between 19 mm and 50 mm (e.g., 19 mm, 32 mm, 38 mm, or 50 mm). The work surface 104 has a width 238 of between 10 mm and 10000 mm, between 100 mm and 5000 mm, between 800 mm and 1200 mm, or about 1000 mm. The work surface 104 has a length 240 of between 60 mm and 6000 mm, between 100 mm and 1000 mm, between 500 mm and 700 mm, or about 600 mm. The first source 130 is positioned at between 10 mm and 300 mm, between 50 mm and 200 mm, or about 180 mm above the work surface 104 and the second source 136 is positioned at between 100 mm and 500 mm, between 200 mm and 300 mm, or about 280 mm above the work surface 104. The image capture system 116 is configured to capture the at least one image 128 of cavities placed anywhere on the work surface 104. The image capture system 116 includes a camera set with a distance of between 100 mm and 2000 mm, between 500 mm and 1500 mm, or about 1100 mm between the lowest tip of the lens and the work surface 104. The camera has been 10 and 1000 megapixels, between 20 and 1000 megapixels, at least 40 megapixels or about 45 megapixels. In the illustrated example system of FIG. 5, the image capture system 116 is fixed in position (e.g., not moveable relative to the frame).

Figure 6:
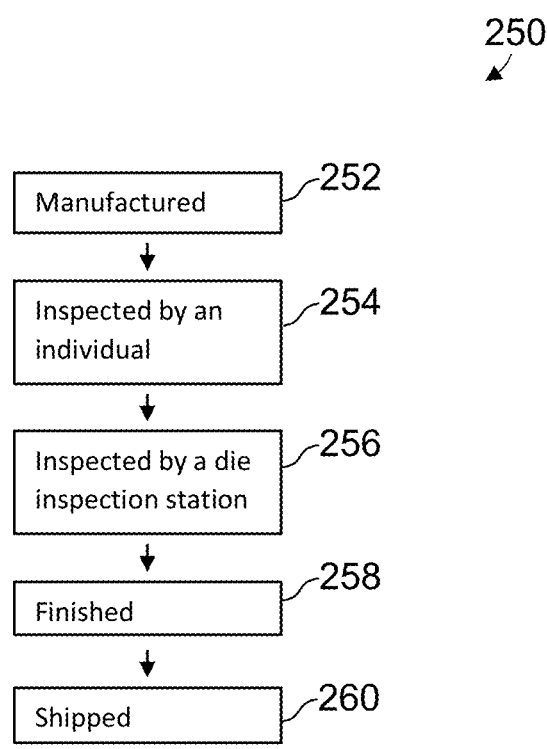
FIG. 6 is a flow diagram of a production process.

Referring now to FIG. 6, the die inspection station 100 and/or method 200 may be part of a larger process 250. The process 250 includes, at step 252, manufacturing of the cutting die (e.g., manufacturing cutting die 106, such as manually or using an automated or partially automated process).

At step 254, the cutting die is inspected by a manufacturing checker (e.g., an individual). For example, the manufacturing checker may check for cavity levelness, cavity features (e.g., punches, slits, notches, or solids), or cavity perimeter accuracy. In some examples, the manufacturing checker performs a rough review of the cutting die prior to the use of a die inspection station.

The process 250 also includes, at step 256, the use of a die inspection station (e.g., die inspection station 100 and/or method 200).

The process 250 then includes, at step 258, finishing the cutting die. Finishing may include washing and drying the cutting die, painting and/or baking the cutting die, and/or installing cavity foam, rubber, faceplate, or anti-skid material. At step 260, the cutting die is shipped. Shipping may involve packing the cutting die prior to shipping to a customer.

The present invention has been described here by way of example only. Various modification and variations may be made to these exemplary embodiments without departing from the scope of the invention, which is limited only by the appended claims.

The invention claimed is:

1. A die inspection system, comprising:
  a work surface to receive an entire cutting die thereon for inspection, the cutting die having a cutting edge;
  a housing supporting the work surface;
  an image capture system supported by the housing and arranged to capture at least one image of the entire cutting edge of the cutting die on the work surface;
  an illumination source supported by the housing and arranged to illuminate the cutting die at an oblique angle while the image capture system captures the at least one image;
  at least one data storage device storing a set of cutting edge specifications;
  at least one processor communicative coupled to the image capture system, communicatively coupled to the at least one data storage device, and operable to:
    receive the at least one image,
    retrieve the set of cutting edge specifications,
    identify the entire cutting edge as shown in the at least one image,
    comparing the cutting edge as shown in the at least one image to the set of cutting edge specifications, and generate an inspection report indicative of whether the entire cutting edge as shown in the at least one image is within a tolerance of the set of cutting edge specifications.

2. The die inspection system of claim 1, wherein the inspection report includes a modified image modified from the at least one image to indicate whether the cutting edge as shown in the at least one image is within the tolerance of the set of cutting edge specifications.

3. The die inspection system of claim 1, wherein:
the die inspection system includes a calibration plate with a plurality of reference points regularly spaced and distributed over a top surface of the calibration plate, the calibration plate sized to fit on the work surface, and
the image capture system is operable to move between at least a first position and a second position, and is operable to be calibrated using the calibration plate after being moved to allow for a distortion to be corrected.

4. The die inspection system of claim 1, wherein the illumination source includes at least one light emitting diode.

5. The die inspection system of claim 1, wherein the illumination source includes a first source at a first distance above the work surface and a second source at a second distance above the work surface, the second distance being at least one and a half times the first distance.

6. The die inspection system of claim 1, wherein the at least one processor includes a machine vision algorithm to detect the cutting edge when the cutting edge has been chalked.

7. The die inspection system of claim 1, wherein the cutting die is at least 10 cm wide.

8. A die inspection system, comprising:
a work surface to receive an entire cutting die thereon for inspection, the cutting die resting with a lower end of the cutting die on the work surface and a cutting edge on an upper end of the cutting die opposite the lower end;
a housing supporting the work surface;
an image capture system supported by the housing above the work surface with an optical axis of the image capture system generally perpendicular to the work surface, the image capture system arranged to capture at least one image of the entire cutting edge of the cutting die; and
an illumination source supported by the housing and arranged to illuminate the entire cutting edge at an oblique angle while the image capture system captures the at least one image;
an electronic screen supported by the housing;
at least one data storage device storing a set of cutting edge specifications;
at least one processor communicative coupled to the image capture system, communicatively coupled to the at least one data storage device, and communicatively coupled to the electronic screen, the at least one processor operable to:
receive the at least one image,
retrieve the set of cutting edge specifications,
identify the entire cutting edge as shown in the at least one image to the set of cutting edge specifications,
generate a modified image modified from th at least one image to indicate whether the identified cutting edge in the at least one image is within the tolerance of the set of cutting edge specifications, and display the modified image via the electronic screen.

9. The die inspection system of claim 8, wherein the work surface is a generally planar and stationary surface and is rigidly secured to the housing such that the cutting die is stationary when on the work surface.

10. The die inspection system of claim 8, further comprising a calibration plate for use in calibrating the image capture system, the calibration plate including a plurality of reference points regularly spaced and distributed over a top surface of the calibration plate, the calibration plate sized to fit over the work surface.

11. The die inspection system of claim 10, wherein the die inspection system can be reconfigured between a first image capture configuration and a second image capture configuration, a distance between the image capture system and the calibration plate of the die inspection system being greater in the second configuration than in the first configuration.

12. A method of inspecting a cutting die, comprising:
capturing at least one image of an entire cutting edge of an entire cutting die that is on a work surface;
retrieving, using at least one electronic processor, a set of cutting edge specifications from at least one electronic data storage device;
identifying the entire cutting edge as shown in the at least one image;
comparing, using the at least one electronic processor, the entire cutting edge as shown in the at least one image to the set of cutting edge specifications;
determining that the entire cutting edge as shown in the at least one image is within a tolerance of the set of cutting edge specifications; and
generating, using the at least one processor, an inspection report for the cutting die, the inspection report indicative that the entire cutting edge as shown in the at least one image is within the tolerance of the set of cutting edge specifications.

13. The method of claim 12, wherein the inspection report includes the at least one image or a modified image modified from the at least one image to indicate whether the cutting edge as shown in the at least one image is within the tolerance.

14. The method of claim 12, further comprising, prior to capturing the at least one image, a human operator placing the cutting die on the work surface.

15. The method of claim 12, further comprising, prior to capturing the at least one image, chalking the cutting edge.

16. The method of claim 15, wherein chalking the cutting edge includes an individual manually applying chalk to the cutting edge.

17. The method of claim 12, further comprising, while capturing the at least one image, illuminating the cutting edge at an oblique angle.

18. The method of claim 12, wherein capturing the at least one image includes using an image capture system supported by a housing to capture the at least one image, the housing supporting the work surface and supporting the image capture system above the work surface.

19. The method of claim 18, further comprising:
moving, following capturing the at least one image, the image capture system from a first position relative to the work surface to a second position relative to the work surface;
calibrating the image capture system to correct for a lens distortion;
capturing at least one further image of a further entire cutting edge of a further entire cutting die;

retrieving, using the at least one electronic processor, a further set of cutting edge specifications from the at least one electronic data storage device;
identifying the further entire cutting edge as shown in the at least one further image;
comparing, using the at least one electronic processor, the further entire cutting edge as shown in the at least one further image to the further set of cutting edge specifications;
determining that the further entire cutting edge as shown in the at least one further image is within a further tolerance of the further set of cutting edge specifications; and
generating, using the at least one processor, a further inspection report for the further cutting die, the inspection report indicative that the further entire cutting edge as shown in the at least one further image is within the further tolerance of the further set of cutting edge specifications.

* * * * *